(12) United States Patent
Rhine (10) Patent No.: US 6,289,383 B1
(45) Date of Patent: *Sep. 11, 2001

(54) SYSTEM AND METHOD FOR MANAGING DATA RETRIEVAL BANDWIDTH

(75) Inventor: Scott A. Rhine, Frisco, TX (US)

(73) Assignee: Hewlett-Packard Company, Palo Alto, CA (US)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/201,574

(22) Filed: Nov. 30, 1998

(51) Int. Cl.⁷ ........................................ G06F 17/30
(52) U.S. Cl. .................. 709/227; 709/228; 709/229; 709/230; 707/9; 707/10
(58) Field of Search .................. 707/10, 9; 709/230, 709/104, 105, 207, 223, 224, 228, 249, 227; 711/107, 230, 147, 148, 149, 150, 151, 9, 100, 121, 122, 146, 167, 170; 345/512; 358/404; 84/604, 622; 370/252

(56) References Cited

U.S. PATENT DOCUMENTS

| | | | | |
|---|---|---|---|---|
| 5,218,456 | * | 6/1993 | Stegbauer et al. | 358/404 |
| 5,251,152 | * | 10/1993 | Notess | 709/224 |
| 5,453,987 | * | 9/1995 | Tran | 370/447 |
| 5,606,359 | * | 2/1997 | Youden et al. | 725/88 |
| 5,745,694 | * | 4/1998 | Egawa et al. | 709/225 |
| 5,764,915 | * | 6/1998 | Heimsoth et al. | 709/227 |
| 5,867,483 | * | 2/1999 | Ennis, Jr. et al. | 370/252 |
| 5,884,038 | * | 3/1999 | Kapoor | 709/226 |
| 5,938,733 | * | 8/1999 | Heimsoth et al. | 709/230 |
| 5,999,963 | * | 12/1999 | Bruno et al. | 709/104 |
| 6,006,269 | * | 12/1999 | Phaal | 709/227 |

OTHER PUBLICATIONS (IEEE publication, "Self–adaptive user profile for large–scalle data delivery" Dept. of Computer Science, University of Maryland, pp. 622–633, Mar. 2000.*

* cited by examiner

Primary Examiner—Thomas Black
Assistant Examiner—Diane D. Mizrahi (57) ABSTRACT

A retrieval system and method which allows a computer system to adjust the data retrieval start times of the data retrieval requests from the different users in order to achieve overall system objectives. Each user is assigned a percentage availability which then determines a factor for all of the applications run by that user. This factor is associated with each request for data retrieval from any application. For any given batch of data requests there is calculated a start time for each data request, with the start time dependent upon the assigned factor. The start times from all users for that batch are then ordered in accordance with the calculated start times. The system will reorder the start times when efficient operation requires such reordering.

19 Claims, 4 Drawing Sheets

| ORDER OF FULFILLMENT | | |
|---|---|---|
| USER | START TIME | ASSIGNED PERCENTAGE |
| REGISTRATION | 443 | 70 |
| REGISTRATION | 1906 | 70 |
| REGISTRATION | 3369 | 70 |
| ACCOUNTING | 4096 | 20 |
| REGISTRATION | 4832 | 70 |
| REGISTRATION | 6295 | 70 |
| ACCOUNTING | 9216 | 20 |
| ACCOUNTING | 14336 | 20 |
| RESEARCH | 19457 | 5 |
| DEAN | 33114 | 3 |
| RESEARCH | 39937 | 5 |
| LAW SCHOOL | 50177 | 2 |
| DEAN | 67247 | 3 |
| DEAN | 101362 | 3 |
| LAW SCHOOL | 101377 | 2 |
| DEAN | 104775 | 3 |
| DEAN | 138908 | 3 |

FIG. 1

| USER | PERCENTAGE | FACTOR |
|---|---|---|
| RESEARCH | 5 | 20480 |
| ACCOUNTING | 20 | 5120 |
| REGISTRATION | 70 | 1463 |
| DEAN | 3 | 34133 |
| LAW SCHOOL | 2 | 51200 |

FIG. 2

| TRANSFER REQUESTS | TOTAL NUMBER REQUESTS | TIME PERIODS | | | | | | | | |
|---|---|---|---|---|---|---|---|---|---|---|
| | | 0 | 1 | 2 | 3 | 4 | 5 | 6 | 7 | 8 |
| RESEARCH | 2 | | 1 | 1 | | | | | | |
| ACCOUNTING | 3 | 1 | | | 2 | | | | | |
| REGISTRATION | 5 | | | | | 3 | | 2 | | |
| DEAN | 5 | | | | | | 2 | | 3 | |
| LAW SCHOOL | 2 | | 1 | | | | | | | 1 |

| USER | END TIMES IN MICROSECOND INTERVALS ||||||||||
|---|---|---|---|---|---|---|---|---|---|
| | 0 | 1 | 2 | 3 | 4 | 5 | 6 | 7 | 8 |
| RESEARCH | | 20481 | 40961 | | | | | | |
| ACCOUNTING | 5120 | | | 10240 15360 | | | | | |
| REGISTRATION | | | | | 1467 2930 4393 | | 5856 7319 | | |
| DEAN | | | | | | 34138 68271 | | 102404 105817 139950 | |
| LAW SCHOOL | | 51201 | | | | | | | 102401 |

FIG. 3B

| USER | START TIMES IN MICROSECOND INTERVALS ||||||||||
|---|---|---|---|---|---|---|---|---|---|
| | 0 | 1 | 2 | 3 | 4 | 5 | 6 | 7 | 8 |
| RESEARCH | | 19457 | 39937 | | | | | | |
| ACCOUNTING | 4096 | | | 9216 14336 | | | | | |
| REGISTRATION | | | | | 443 1906 3369 | | 4832 6295 | | |
| DEAN | | | | | | 33114 67247 | | 101362 104775 138908 | |
| LAW SCHOOL | | 50177 | | | | | | | 101377 |

FIG. 4

| ORDER OF FULFILLMENT | | |
|---|---|---|
| USER | START TIME | ASSIGNED PERCENTAGE |
| REGISTRATION | 443 | 70 |
| REGISTRATION | 1906 | 70 |
| REGISTRATION | 3369 | 70 |
| ACCOUNTING | 4096 | 20 |
| REGISTRATION | 4832 | 70 |
| REGISTRATION | 6295 | 70 |
| ACCOUNTING | 9216 | 20 |
| ACCOUNTING | 14336 | 20 |
| RESEARCH | 19457 | 5 |
| DEAN | 33114 | 3 |
| RESEARCH | 39937 | 5 |
| LAW SCHOOL | 50177 | 2 |
| DEAN | 67247 | 3 |
| DEAN | 101362 | 3 |
| LAW SCHOOL | 101377 | 2 |
| DEAN | 104775 | 3 |
| DEAN | 138908 | 3 |

SYSTEM AND METHOD FOR MANAGING DATA RETRIEVAL BANDWIDTH

TECHNICAL FIELD OF THE INVENTION

This invention relates to storage management systems and methods and more particularly to such system and method for efficiently managing the retrieval of data in accordance with desired system operational protocol.

BACKGROUND OF THE INVENTION

It is, of course, well known that computers use disks for the storage of data. Over the course of years as the CPU and other components of the computer architecture have become faster and faster the data retrieval speed (bandwidth) from these disks has also become faster. Many arrangements have been used, including interleaving, stripping, the concurrent use of multiple disks, high speed caching and including many forms of "look ahead" processing. All of which have not kept up with the continued advances in CPU processing speeds.

One solution to the problem which has only limited success is to partition the disk so that different users have access to only a preassigned disk space. This solution does not solve the multiple access problem with more than one user trying to obtain data from the disk at the same time, albeit from different apportioned disk spaces.

Another solution has been to allow certain access to have "immediate" data retrieval capability, almost on an interrupt basis. Here again, only one user can obtain data at a time using such a retrieval system. In such a system the user gives the system a number of bytes per second (or some other measure of desired access) and the system operates to provide this magnitude of throughput; however, such systems can only do this for what is called direct access to the disk. Thus, until the request for this group is met, no other application can access the storage. Accordingly, only one group has priority and everybody else waits.

Care must also be taken to avoid what is known as priority inversion. This results when a user has the lowest priority on the system (perhaps being allowed to have 1% of the CPU) and that user makes a high number of disk requests. Inversion occurs because CPU consumption stops as soon as a disk request is made and the required operation does not use the full time slot allotted. In such a situation, the user gets a higher priority to make up for the under utilization of the CPU. Thus, in such a situation, the 1% user can effectively stop the entire system. The problem is compounded when large data transfers are needed, such as a backup operation when much or all of the disk data is transferred to another storage medium, such as to a magnetic tape. Or when a large amount of data is required for a particular operation. Often in these situations if the data retrieval bandwidth is not fast enough the operation fails. For example, if the data does not come off of the disk fast enough to keep up with the tape streaming speed then the tape shuts down and the transfer process becomes inefficient. Applications that must wait for data retrieval often also shut down or shed load so as to match themselves to accommodate the data retrieval bandwidth.

Further compounding the problem is the fact that often many users share the same system, each user having different requirements. Thus, in a university setting many different departments may share the same system. Thus, the math department and the geology departments both may share the same system with the registrar's office where the class scheduling application resides. Thus, the situation can occur (and often does) that one or more of these departments may require disk bandwidth at a time when the other user also demands bandwidth. In this situation simply apportioning the disk among these users (while it solves the disk storage space availability problem) does not solve the problem of simultaneous data access. Also, giving one of the users direct access to the disk will result in the other users not being able to access their data at certain times.

Compounding the problem even further is the fact that certain users will demand equal access with another user, or will demand access in some proportion to the other users.

Thus, there is a need in the art for a system that will allow access to a data storage medium, such as a computer disk drive, on a controllable basis.

There is a further need in the art for such a system which can be selectively adapted so that certain users can be assured of access in a selected proportion to other users.

There is a still further need in the art for a storage access system which will maximize the apparent available data retrieval bandwidth for system users.

There is a need in the art for a storage access system which can be arranged to fairly and consistently apportion the input/output (I/O) between competing user applications allowing each such user application to achieve its apportioned usage.

SUMMARY OF THE INVENTION

These and other objects, features and technical advantages are achieved by a system and method which a system is arranged so as to assign to particular users (or applications) a percentage of the I/O requests from storage. Once the assignment is made to a particular user (application) a factor number becomes associated with each and every data request from that user. The number, in turn, is used to calculate an end time for data retrieval such that the data requested will be available to the user at that end time. Each such end time will take into account the possible start times that then existed will be adjusted accordingly.

In operation, the higher the percentage assigned to the user, the lower will be the factor for that user. Thus, when multiple access requests arrive from different users various end times are calculated, each dependent upon the last end time granted that user and the size of the current request available start times, which in turn are calculated on a first to arrive basis.

Using this system and method it would be expected that a user with a 75% retrieval availability will be granted 3 storage access requests for every one request granted to the 25% user and an 80% user will, for any batch of retrieval requests, be granted 8 out of every 10 requests.

The system, in effect, delays retrieval requests for periods of time so that other users can get into the request queue in relationship to their assigned percentages. Thus, access to storage is no longer on a first to request basis but rather each request is processed to determine when, based on an arbitrary start time for each batch of requests, the data will be retrieved. From the user's perspective there is no perceived difference in retrieval time and so long as the time is under a certain amount, for example, one second, the user does not know that the retrieval process was artificially delayed as to any particular request.

In some situation it is advantageous to rearrange the order of the retrieval requests, even after they have been calculated as discussed above so that the system will operate even faster. Thus, by way of example, the physical location on the disk of certain data may dictate when that data should be obtained for maximum retrieval performance. In such situations, request orderings for such data will be rearranged It is one technical advantage of the invention that for every batch of storage device requests the actual data retrieval start times will be adjusted for each user in accordance with the percentage availability assigned to that user.

It is a further technical advantage of the invention that the start times will be further adjusted dependent upon efficient operation and data retrieval techniques.

It is a still further technical advantage of the invention that even the users who have been assigned 1% of the data retrievals will not be blocked from data retrieval (starvation) and that low assigned percentage users can not block any other user from retrieval regardless as to how many retrieval requests the low percentage user makes (inversion).

The foregoing has outlined rather broadly the features and technical advantages of the present invention in order that the detailed description of the invention that follows may be better understood. Additional features and advantages of the invention will be described hereinafter which form the subject of the claims of the invention. It should be appreciated by those skilled in the art that the conception and specific embodiment disclosed may be readily utilized as a basis for modifying or designing other structures for carrying out the same purposes of the present invention. It should also be realized by those skilled in the art that such equivalent constructions do not depart from the spirit and scope of the invention as set forth in the appended claims.

BRIEF DESCRIPTION OF THE DRAWINGS

For a more complete understanding of the present invention, and the advantages thereof, reference is now made to the following descriptions taken in conjunction with the accompanying drawings, in which.

DESCRIPTION OF THE INVENTION

Figure 1:
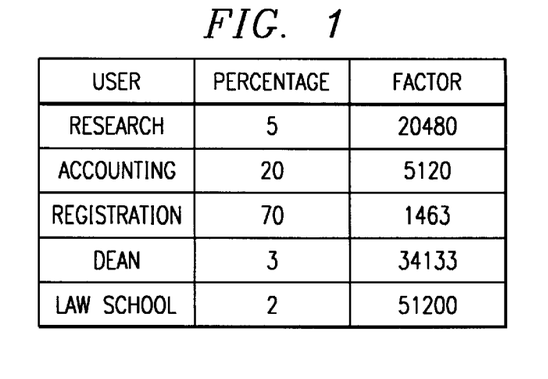
FIG. 1 shows an example of several users who have assigned to them a percentage of the total for storage access.

By way of example, let us assume that the transfer rate is 1 KB (kilobyte) every 128 microseconds and then let us assume that each data request is for 8 K Bytes. Thus, each request will take 1024 microseconds. Using this assumption as to transfer rate and transfer size then a time factor is assigned to each user dependent upon the percentage of retrieval time assigned to that user. Every user must have at least 1% assigned. Then, using the formula:

$$\text{transfer rate} * \text{transfer size} * 100 / \text{assigned percent} \quad (1)$$

there can be calculated a factor for each user as shown in FIG. 1.

The END TIME is calculated as $$\text{the FACTOR} + \text{the previous request END TIME} \quad (2)$$

where the previous request is from the same user, and where START TIME is calculated as $$\text{the END TIME} - (\text{transfer rate} * \text{transfer size}) \quad (3)$$

In our example, then, the START TIME equals the END TIME−1024 microseconds.

Figure 2:
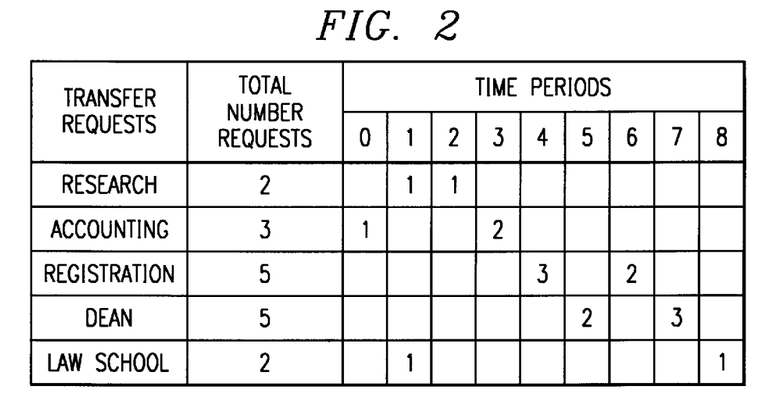
FIG. 2 shows a chart of an example where, over eight time periods, the total number of access requests are bunched and totaled.
Figure 3A:
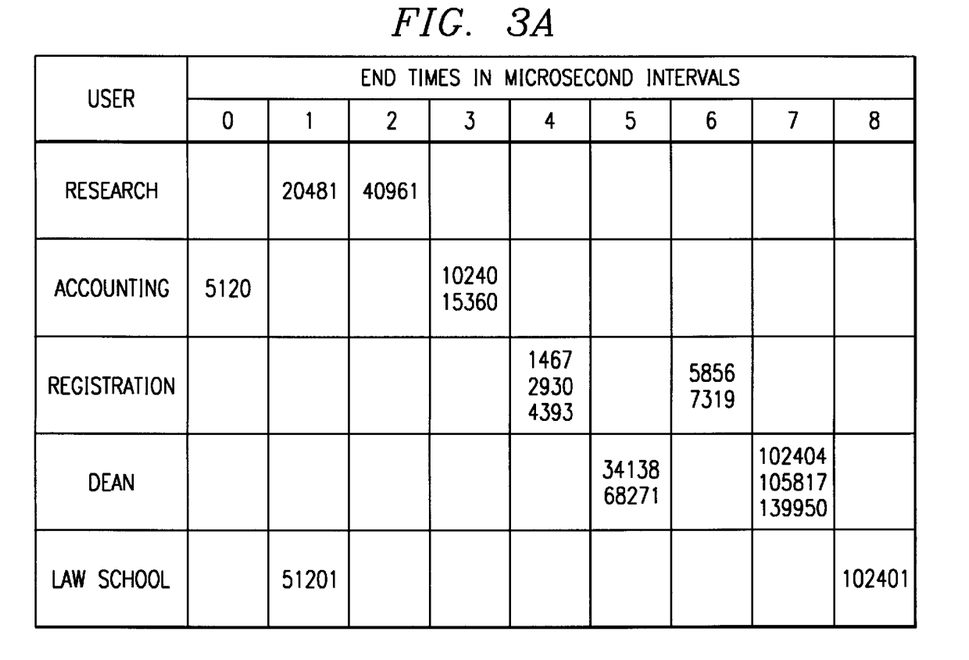
FIG. 3A shows a chart of calculated END TIMES associated with each of the requests shown in FIG. 2.

Using the assumptions discussed above and the factors shown in FIG. 1 for the various users and based on the requests shown in FIG. 2 the chart of FIG. 3A is constructed, showing the calculated END TIME. Note that each calculation for each user is made independent of the calculations for the other users, even when they arrive at the same time.

Figure 3B:
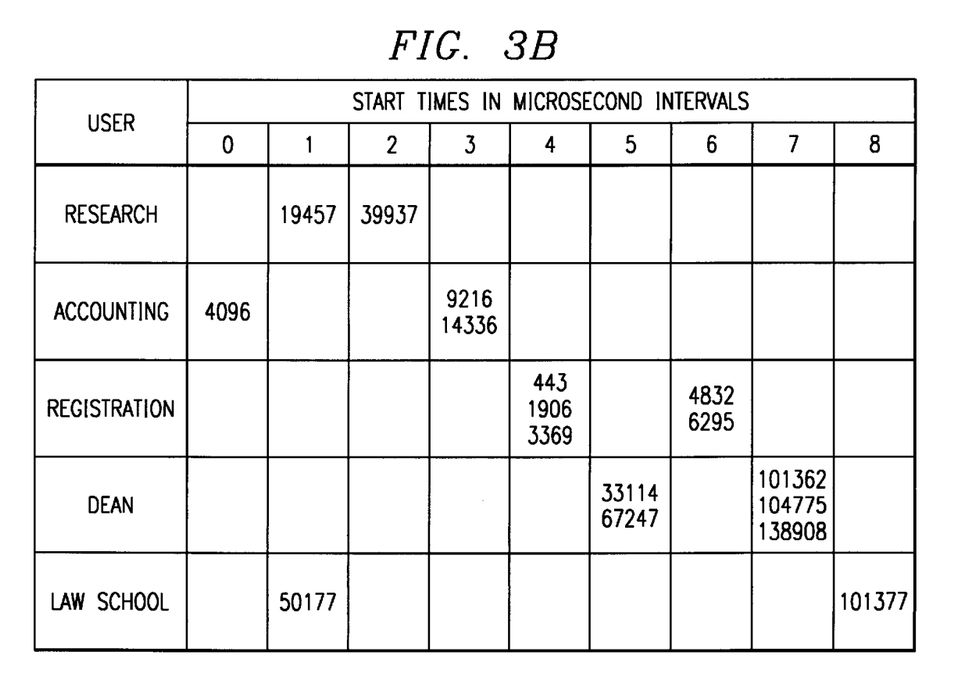
FIG. 3B shows a chart of calculated START TIMES associated with each of the requests shown in FIG. 2.

The START TIME for each user request is the END TIME for that request minus the rate*size (1024 in our example) and is shown in FIG. 3B.

Figure 4:
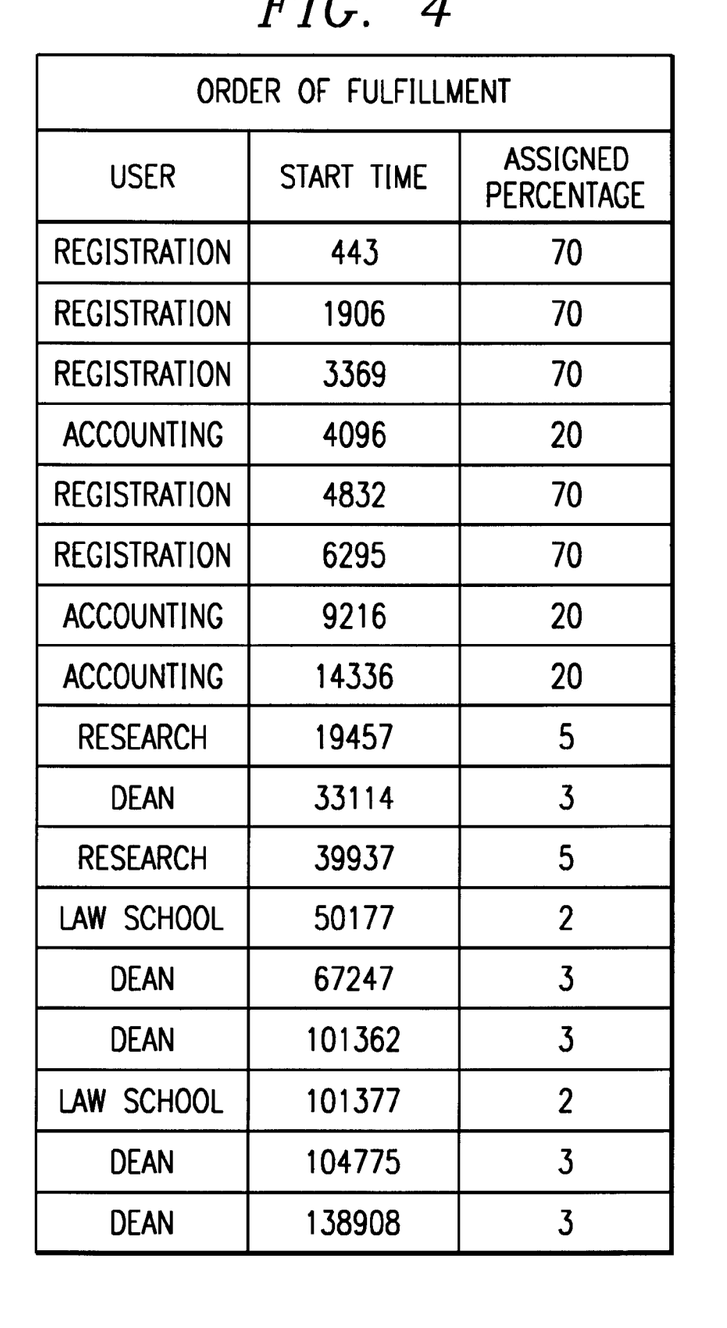
FIG. 4 shows a chart where the START TIMES of FIG. 3B are ordered for processing by start time.

FIG. 4 shows the line up of the calculated START TIMES. It is easy to see that the requests from Registration are high up on the list since Registration carries a 70 percent factor while the Law School is low on the list having only a 2 percent factor.

Since a particular request does not start retrieving data until its calculated START TIME there could be "holes" in the scheduling for any particular batch. These holes create an availability potential if, in fact, a request comes in from a user having a higher percent availability which results in an earlier calculated START TIME for that user. Thus, if there had been additional requests from Registration or Accounting they would have been processed at the times shown by the insert shown in FIG. 4. The processing of the data access requests follows the line up shown in FIG. 4.

The processing of the accesses to the various disks is controlled by the calculated START TIMES for each user request which in turn were calculated based upon the factor assigned by the system administrator. An arbitrary eight one microsecond time periods are chosen as the cluster around which the times were ordered for a particular batch. The "batch" time is defined by when the disk needs more work. For example, when the disk is ready to accept requests ti takes the next ordered request in order of START TIME. Thus, it is the disk availability that determines batch size or service rate. The method will work for any arrival pattern or rate. Note that the same ordering would have occurred had all the requests arrived at essentially the same time, since the calculated END TIME (and the resultant calculated START TIME) for each request is essentially independent of the time in which the request arrives. The START TIME for each request is derived based upon its respective assigned factor and the calculated END TIME of the previous request from the same user. This then eliminates contention problems and insures that all users will be served in an approximation of their assigned factors.

In situations where there are no requests pending from higher percentage users and the disk is ready to accept request, the pending requests in order of START TIME would not have to wait on possible requests coming from a higher percent user.

The example has assumed that all data transfers have been of 8 K bytes. As discussed above, when larger data transfers have been required they have taken the form of several requests coming at the same time. By using the full formula number (1) and not the shorthand factor, the same result would be achieved as calculated in the example above, except that there would not be multiple simultaneous data requests.

In addition, while we are talking about hard drives and writing data therefrom, this system and method can work for a variety of different devices for the efficient transfer of data or other information. For example, data from different users could be competing for time on a communication path and this system and method could be used to insure use of the communication facility according to a protocol to allow different users different transmission times.

Also, note that while we have given an example of a single storage device this most likely will be a plurality of such devices, some or all of which are working in cooperation with each other. The system, as will be discussed in more detail, will keep track of all such devices and will order the start times across all devices.

The most simplistic view of disk bandwidth is that of user requests which actually make it to the disk. For this disk IO users will want per-device statistics. For Process Resource Manager (PRM) sharing to be meaningful, these statistics must be broken down by PRM group. The ideal place to gather these statistics uniformly for all device types would be at or near the logical volume manager layer (LVM), the same location as the bandwidth control. There must also be controls to turn the collection on and off by device, as well as a call to collect this data from user space. The most natural interface for these changes is through the existing FSS (Fair Share Scheduler) kernel interface.

General system activity such as virtual memory (VM) paging and swapping should be excluded from usage measurements.

Direct-to-disk transactions can occur in asynchronous IO, raw character device, IO, and VxFS file system data transfers of greater than some minimum size (initially 128 KB). Direct-to-disk reads or writes allocate an in-memory buffer to pass to the disk driver instead of using the buffer cache.

Many data bases bypass native file systems (for performance reasons) and carry out their transactions using the raw character device. Therefore, this category of IO should be examined with particular interest. The goal is that every direct IO be associated to a specific PRM group for the purposes of charging and sharing.

To display device statistics or direct block statistics by PRM group, kernel changes are required.

Figure 7:
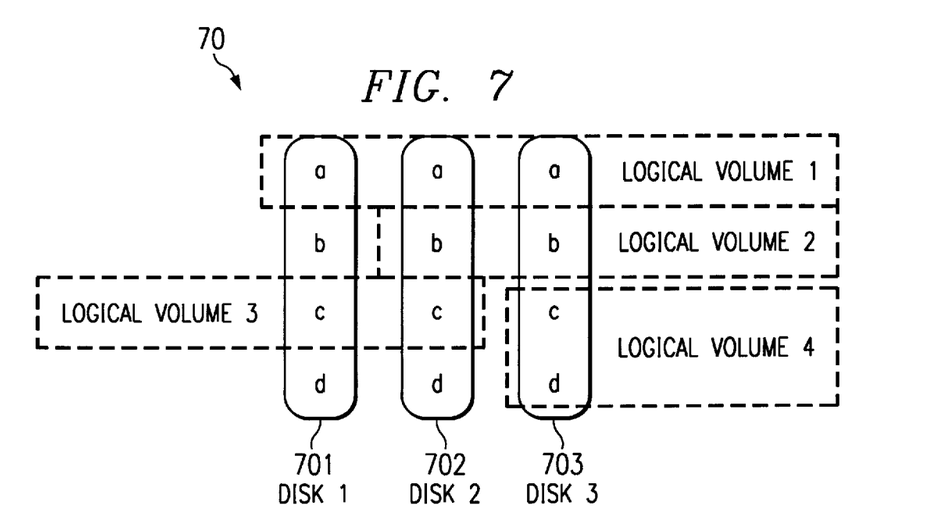
FIG. 7 shows a logical volume example with 3 storage disks.

A logical volume is a collection of one or more physical volumes upon which a file system, swap, or raw data could be placed as shown in FIG. 7. A logical volume is managed by a pseudo-device driver (major 64 residing in/dev/vgxx) that sits between the file system and the actual device. A logical volume can span several devices such as disks 701, 702, and 703 (like a stripe containing a partition from each disk), and a single device can host many volumes.

Choosing the LVM layer to hold the new disk bandwidth control and data collection code has several advantages. Listed below are the main advantages of the LVM over several alternative locations considered:

1) Device driver level: Changes are localized to a much smaller area in the kernel and support a much broader range of physical disk devices.
2) Filesystem level: Accesses to raw devices are controllable. Database applications historically use raw partitions rather than a file system.

A logical volume group is a collection of LVM disk partitions that access the same physical disks. For example, if two disk stripes use any partitions that reside on the same physical disk, they are part of the same Logical Group. To ensure consistent performance, PRM requires that partitions within a logical disk group be configured and enabled collectively.

Adding data collection code in the LVM layer has the advantage of catching all buffered IO which actually gets to the device. Options include either implementing the data collector as a change to the logical volume manager strategy routine or add a new layer for between here and the actual device strategy.

All I/O is not required to go through the logical volume interface. But, it could be made a restriction that all partitions that wish to be under PRM control must be accessed through LVM. File systems and swap partitions, when defined, can be directed to the pseudo-device instead of the real device. This is also true for raw IO and the character devices. Each block LVM device (say /dev/vg00/1vol1) has a corresponding raw device (/dev/vg00/r1vol1) beginning with an "r".

Access to the underlying character devices would need to be restricted. Permission for these devices normally exclude everyone but root from tampering with the base device. Any job running as root can already subvert any resource controls.

Large filesystems tend to already use logical volumes for striping and mirroring.

The kernel should not act on the collected data directly, but make it available to user space where feedback will be provided. The data collected should be configurable. There must be controls to turn the collection on/off by device, and a call to collect this data from user space. The device specified must be a logical volume group. Data returned will be a grand total collected since enablement.

As an example, the following data should be collected. Each of these would be stored on a per LVM device per PRM group basis.

a. total data transferred, b. number of requests outstanding, and c. number of bytes requested for this group.

If the hardware bandwidth is not what is expected, that can be a sign that the request size is too small, or the controller is overloaded by requests from several disks. The request size can be easily computed with the statistics available. If the size is too small, it provides valuable performance feedback. If the controller is overloaded, this lets the administrator know to reconfigure the disks or buy more controllers.

If the hardware bandwidth is fine, but the individual user's effective bandwidth is not what is expected, then the time spent on the disk queue is too high. This delay generally reflects on the queuing priority scheme implemented or that the group in question needs to negotiate a higher percentage share. Care should be taken to make sure a swap partition isn't thrashing a performance critical device.

The grain size at which we take these averages could be user definable. However, allowing too much sampling will cut performance. A sample interval of less than one second would not make sense, either, for bandwidths measured in megabytes per second.

Furthermore, measurements will be over an entire PRM group, not just a single process. One process in a PRM group might get less IO because the others are getting more. This should be considered when configuring PRM groups.

A per-spindle or per-device measurement is the smallest unit where bandwidth measurements make sense. For RAIDs, stripes, and logical volumes, data will need to be combined over several spindles. A file system on one disk partition could seriously affect performance on every other file system using this disk. Moreover, bandwidth is contagious and dynamic. It is contagious because two stripes could overlap some of the same disks, and controllers can share disks as well. Since IO cards can be swapped on running systems, and extent based file systems can relocate volumes on the fly, this hierarchy of influence is highly fluid. Absolute bandwidth guarantees can be broken on a SCSI device when we attempt more than 30 MB/second total to multiple disks sharing the same controller.

The sharing of disk IO should work as much as possible like the sharing of other limited resources in PRM. Shares will be based on the PRM group that a process currently belongs to. Only an administrator can create groups and change entitlement allocations. At different times during the day or at different event triggers, the administrator may fine tune or entirely switch the scheme with ease.

Fairness only matters when there is contention for a resource. When there is not competition for a disk resource its use will be maximized until a conflict arises. Bandwidth service levels are not guaranteed during the transition period between configurations. All absolute guarantees don't apply when the system is swapping. Resources are proportioned for forward progress of the highest priority jobs.

Given that the measurement code is at the volume manager layer, it makes sense to put the control code in the same layer. Controlling disk bandwidth in LVM can force the requirement that all members of a stripe have the same bandwidth allocation. It would be futile, for example, to guarantee one disk at 80% when every other member of the stripe was limited to only 10%.

Others have implemented disk bandwidth control for large raw IO blocks. When a file system, such as VxFS has to do a large (greater than fs_direct_sz, currently 128 KB) IO operation, it often eliminates the overhead of copying to the buffer cache entirely and builds its own pseudo buffers. This is known as physIO, and is one method of providing IO bandwidth guarantees. This feature is essential for jobs that require a minimum amount of data flow to keep an application or another device busy. Video streaming is the example that appears most often in the literature.

If we only had to worry about physIO on the system, we could keep the running total of MB and seconds for each request and try to make sure we hit the goal. But very large chunks would throw off any fairness for any other user on the system. We must break the physIO into smaller chunks for bandwidth adaptation algorithms to be effective, but not so small that the overhead kills the benefit of the physIO. 1 MB has been suggested as a maximum because the disk caching mechanism is about this size, and VxFS breaks all IO into chunks this size (maxtransfer) already.

Given that each large IO is presort by block and is larger than the amount the hardware disk queue can sort, we don't have to worry about diminishing performance by not putting large requests in the existing block-ordered queue.

Given this, how do we prioritize fairly? Taking the allowed fraction of bandwidth for the requestor's group for this volume (f(g,v)), we calculate when it can complete and still meet the guarantee.

$$\text{desired end delta} = (1/f(g,v)) * \text{device transfer rate} * \text{request size}$$

Since we really want to schedule the IO start time, not the IO completion time, we subtract off the time for IO.

$$\text{desired start delta} = ((1/f(g,v))-1) * \text{device transfer rate} * \text{request size}$$

Note that we want absolute allowances, not relative allowances based on the other groups currently sharing the queue. There are two reasons for this. First, it takes too much overhead to track all the groups currently on the queue, when a group joins or leaves the resource, a new relative priority could put your requests out of order.

If we got simultaneous requests from several groups at once, we could arbitrate among them. Unfortunately, this can lead to starvation of low priority groups. To extend our model, when we get several consecutive requests from the same group, we want them to be scheduled sequentially. If the last request terminated at some point in the past, we use the current time stamp.

$$\text{desired start time} = \max(\text{now}, \text{last\_scheduled\_completion}(g,v)) + ((1/f(g,v))-1) * \text{device transfer rate} * \text{request size}$$

With each computation of desired start time, we would update the last scheduled completion for this group.

These percent bandwidth goals could be described in the PRM configuration file with much the same format as existing resources. PRM should be able to activate/deactivate this feature with a new ioctl or fss call. The call turning the feature on would have a pointer to an array of 64 elements, each with a priority scale. This priority value would be calculated by the application level above, and reflect the constant part of the equation above.

$$\text{priority}(g,v) = ((1/f(g,v))-1) * \text{device transfer rate}$$

where the fractions all add up to less than or equal to 1 (100%). If we express the transfer rate in microseconds per KB of data, we should end up with a range of integer weights from 0 to about 2 million. This should stay an integer for any transfer rate below 2 GB/sec, at which point memory copies would become our bottleneck in any currently planned or implemented architecture.

There could be an additional weighting parameter on systems where reads and writes take place at different rates. Thus, at the time of disk enqueuing, we can sort the large IOs by the time priority $$\text{Start priority} = \text{priority}(g,v) * \text{read/write weight} * \text{request size}$$

If we take 1 second as the minimum grain size for the sampling feature, 10 to 160 large read/writes can be done in this time, giving our scheme a chance to closely approximate our percentage goals. When the device is undersubscribed, this algorithm allows priority jobs to finish sooner. Even when overloaded, the algorithm apportions bandwidth by the same weighted percents. This mechanism also prevents starvation, guaranteeing even the lowest priority job's start time.

This prioritization policy can actually help total system throughput in more ways than one for large IO jobs because the task doing them cannot free valuable locked memory or use CPU until this IO has completed. If memory is extremely tight, we may have to up the priority on the bigger transfers.

This inter-resource arbitration will need to go on at a higher level. The kernel won't do anything about missed start goals other than report the statistics to the user level where more informed decisions can be made. Why not? Because the kernel can't cope with overloaded resources in a graceful manner for every possible scenario. Not only would the attempt slow IO, it would necessitate far more kernel state than we currently keep. In addition, most fluctuations in sharing are transient in nature. To avoid overreaction, we want to take corrective measures above the disk queue level only when the problem persists over several seconds. Since the PRM daemon is already sampling at this rate and has a direct link to the customer who already knows what the appropriate response should be, this is the natural place to put the control.

Small IO (8 KB and below) is the more common and unfortunately the more complicated case. The biggest problem is that we can't recorder the blocks on the queue too much or performance will suffer and meta-data may not get written out in the proper order. We'll need to modify our rules a little to make this work.

Rule modification 1 for small IO: synchronous system operations have a priority of 100%. In other words, they go right to the head of the queue. Delayed writes and read aheads don't have the same level of time guarantee as an active user waiting on an IO completion. System IO should be infrequent. But even if it's a constant stream, our prioritization scheme guarantees in-order completion of everybody else waiting.

Rule modification 2 for small IO: within a small time quantum, disk blocks must be ordered to guarantee performance. This quantum should be configurable for early tests. It should be in the millisecond range because that's the time scale that it takes to carry out the 8 requests in the hardware disk queue. We have to create buckets several tens of milliseconds wide, and allow the normal disk sort routines to order them within these buckets. Thus, at a macroscopic level, priority is maintained and at a microscopic level performance is obtainable.

Often, it takes the same amount of time to write a few bytes as it does to write a whole disk block. This system favors immediate service of tiny requests which may trash our over all disk performance. The user may wish to establish a minimum weight for any IO to avoid denial of service caused by tiny requests. This value could also be tunable, with an experimentally determined default. Hence, the formula for sort bin is $$\text{sort bin} = \text{priority}(g,v) * \max (\text{request size, minimum size})/\text{quantum size}$$

The quantum size may need to shrink or grow dynamically with the number of requests being placed in each bin.

To demonstrate how the algorithm would work, a few examples are provided. In these examples, assume three disk bandwidth records are defined in the PRM config file, one for each group:

group A: 50%
group B: 25%
group C: 25%

For the sake of the example, assume that the device has a transfer rate that allows 8 KB requests to complete in 1 millisecond. Timing will be at the ms granularity and start at 0 for simplicity.

Say that group A, B, and C are each making 10 requests for 128 KB writes. First calculate how long each new request can take and still meet the bandwidth requirements. The time for an individual IO once it reaches the device should be 128 KB/(8 KB per ms)=16 ms. For group A, the IO can complete at (1/.5)*16 ms=32 ms. In order to make this goal, this IO must be scheduled at the 32−16=16 ms mark.

The timer may have moved up a little by the time the group B request is processed, say to 1 ms. Group B's IO can end at (1/.25)*16+1 ms=65 ms, but must begin it by the 49 ms mark. Bumping the timer again to 2 ms, for group C, its not required to end until 66 ms, but should start by the 50 ms mark.

Assuming that all 10 requests are made before the first IO completes, the second IO for group A will be scheduled for the time immediately following the last scheduled completion for this group (32 ms). To maintain the desired bandwidth, the maximum delay before start (16 ms) will remain the same, making a scheduled start for the second request of 48 and a scheduled termination of 64. Continuing this logic for all requests, groups B and C will have a spacing of 64 ms. We would have a schedule list for each group that looks like:

A: 16, 48, 80, 112, 144, 176, 208, 240, 272, 304
B: 49, 113, 177, 241, 305, 369, 433, 497, 561, 625
C: 50, 114, 178, 242, 306, 370, 434, 498, 562, 626

Using this as an insertion order in the queue, the requests line up like (group request#)

A1, A2, B1, C1, A3, A4, B2, C2, A5, A6, B3, C3, A7, A8, B4, C4, A9, A10, B5, C5, B6, C6, B7, C7, . . .

Notice that group A gets exactly 50% of the time until to completes, and then the other two (with equal percentages) share equally. The first requests starts almost immediately, even though it isn't scheduled till time 16 ms. The entire queue takes only 480 ms to complete, meaning that many IOs start before they are scheduled when we are under utilizing the bandwidth. The scheduling times are just a place holder for a worst case scenario. If an additional request from A came in at a later point in time (say at the 200 ms mark), the time stamps would tell us the fair place to insert the new request (368 ms), and using the last completion time as a starting point, we prevent starvation for the lower priority groups.

What if group A had 10 128 KB write requests just like last example, its schedule times would remain the same. However, B has 100 8 KB write requests and C has none. Each group B transaction would take 1 ms, and be willing to wait an extra 3 ms before starting. Using the large IO schedule:

A: 16, 48, 80, 112, 144, 176, 208, 240, 272, 304
B: 3, 7, 11, 15, 19, 23, 27, 31, 35, 39, 43, 47, 51, . . . , 395, 399, 403

Sorting by schedule time only, the order of service would be (KB| group):

32|B, 128|B, 128|A, 64|B, 128|A, 64|B, 128|A, . . . , 64B, 128|A, 128 B

As the number of requests get higher, the ratio between the two groups approaches the 2:1 ratio reflected by their associated bandwidth allotments (50:25). Once the higher priority group completes, the lower priority group gets the device all to itself.

Unfortunately, the smaller blocks in group B's request need to be ordered by block number for best performance. If we make the buckets 32 ms wide, the new primary key becomes:

A: 0, 1, 2, 3, 4, 5, 6, 7, 8, 9
B: 0, 0, 0, 0, 0, 09, 0, 0, 1, 1, 1, 1, 1, 1, 1, 1, 2, 2, 2, 2, . . . 11, 12, 12, 12, 12

Sorting by the secondary key of block number within the bins results in:

10 bins with 64|B+128|A each in no special order, followed by the final 3 bins of 64|B, 64|B, 32|B Using bins makes no significant difference in the sharing patterns observed or the bandwidths sampled on a 1 second granularity.

If the dbc still has space, the administrator should stop to prioritize delayed write and read ahead traffic to the queue? First, the queue should be ordered because of policy. If order is maintained with the little things, there won't be such an imbalance when the system is out of dbc. Second, this scheme helps prevent synchronous user IO hogging resource. Third, just because the system is not breaking buffer cache doesn't mean that this disk channel isn't already flooded. The current limit is 1 GB of dbc, more than enough to swamp several devices. Fourth, high priority jobs blocked on IO will be able to resume faster with ordering. On a busy system, the entire buffer cache could end up in this device-level queue.

Due to the long delay between delayed writes and the actual flushing of dirty buffers, the buffer may no longer be associated with a process. We have two choices, either charge the process that actually does the IO (the syncd and VxFS deamons would end up with most of it) or somehow tag the buffer header with the owning process. We need the process pointer to get the fss id. Many types of delayed IO already tag the b_proc field with the process pointer. However, we can't just rely on this for two reasons. The process may exit by the time the data is flushed, and the process may change groups. Only the first case is a fatal problem. Thus, the fss id (6 bits) is put into some field of the buffer header.

The new FS_LVM_ADD command receives as arguments the device number, and a list of MAX_FSID+1 priorities. This command checks the legality of the device number, allocates space for the fs device info structure and associates it with the device of volume selected.

The new FS_LVM_DELETE command takes as an argument a device number. This command removes the space and volume flags associates it with monitoring of the given device.

The new FS_LVM_INFO command handles request for the number of devices monitored, or a request to copy the current device information into a user-supplied buffer. This information is summed over all CPUs before being written into the return structure.

The new FS_LVM_START command will activate disk bandwidth sharing and all previously configured devices.

The new FS_LVM_STOP command will stop bandwidth sharing an all disk devices.

The IO queue begin and end code is changed to collect the desired device statistics by PRM group when the new flag is set.

In the routine getblk1, if FSS is active, the cache-pad field must be tagged with the fss id. The getnewbuf routine may also need modification ti initialize the group id.

The API must also be able to convert user-specified bandwidth percentages into a vector of weighted delay multiples for the queue prioritizes to use. The sum of all percents must be less than or equal to 100.

Figure 5:
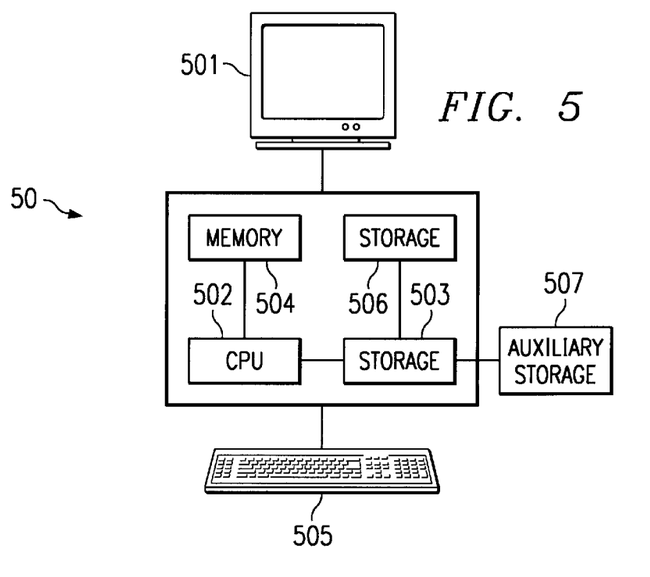
FIG. 5 shows a general purpose computer in which the invention may control storage access.

FIG. 5 shows a fundamental computer system in which this invention could operate to improve access to storage for multiple users. In such an environment, the invention would typically be used in conjunction with the UNIX operating system. While the invention could be used with any operating system, the UNIX system, being multi-user based, is the best mode contemplated. Computer system 50 would typically have a display, or screen, 501, some local memory 504, CPU 502, input 505 and at least one storage 503. Auxiliary storage 506 and 507 could be used and these storage devices could be located within computer 50 or at some other location in a multi processor system.

Figure 6:
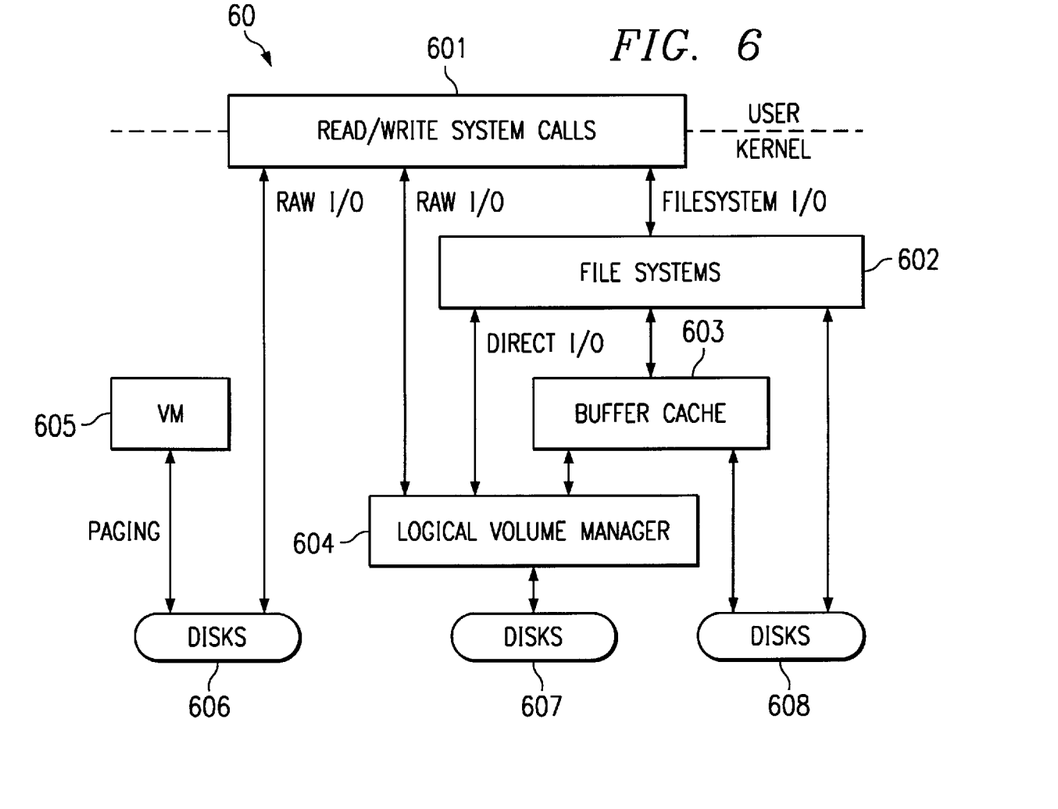
FIG. 6 is a graphic depiction of different types of disk access.

FIG. 6 shows various different types of storage calls to disks 606, 607 and 608. These calls can be to or from virtual memory system 605, system calls 601, file manage 602, logical file manager 604 or cache 603.

The main data structures used below are the arrays prm_vg_enabled and all_volumes.

char prm_vg_enabled [maxvgs];
This is a boolean value, one per volume, indicating whether this volume has PRM entitlements set.

```
typedef struct prm_vg(
    long long tzero;
    long long hand;
    int       factor[MAX_FSID+1] ;
    long long last_time[MAX_FSID+1] ;
    long long transferred[MAX_FSID+1] ;
);
prm_vg_t all_volumes [maxvgs] ;
```

This structure contains the user-defined entitlements, virtual clock, and byte transfer count for each enabled volume group.

Three fields of the disk request buffer are also used:
int b_prio ; /* the request's priority* /
int b_bcount; /* size of the disk request* /
int b_fsid; /* fair share id of process making the disk request* /

The heart of the Disk Bandwidth Manager is the prm_strategy routine. The prn_strategy routine is invoked by the lvm_strategy routine every time we have a disk request and the disk management feature is enabled.

The arguments are the volume index, the number of elements in the volume queue, and the request buffer. The following is pseudo code.

IO begin routine:
input: IO request buffer
output: same IO request with modified priority field
    find the volume group for this request
    if this volume group is not under our control, return.
    if this is a realtime request, return.
    retrieve resource group identifier for IO request
    calculate wait factor=100/share for this resource group
    calculate IO time based on IO request size
    calculate end time=(factor*iotime)
    if (volume group queue empty)
        reset virtual clock [volume group] tzero=now
    if (last scheduled end time for this resource group was in the past)
        set last scheduled end time for this resource group=now
    calculate time delta=last+end−iotime−tzero
    calculate new last scheduled end time for resource group= last+end
    calculate new priority for request=time delta/(2^18)
IO completion routine
input: completed IO buffer
output: none
    find the volume group for this request
    retrieve group identifier for IO request
    increment total bytes transferred for this resource group
    if we control this volume group
        increment virtual clock[volume group] by bytes transferred
        convert priority field back into time stamp
        if (time stamp for completed IO>clock[volume group])
            clock[volume group]=time stamp Note that while the discussion and examples have revolved around a read system, this invention works in the preferred embodiment for both read and write requests.

Also note that the use of the word user refers to actual humans with individual log ins, or computer applications with specific tasks to achieve, or any other grouping defined by the administrator.

Although the present invention and its advantages have been described in detail, it should be understood that various changes, substitutions and alterations can be made herein without departing from the spirit and scope of the invention as defined by the appended claims.

What is claimed is:

1. The method of operating a system where multiple users must from time to time access a bandwidth limited device and wherein each user desires to have a certain percentage of access to said device, the method comprising the steps of:

having assigned to each user a percentage of access time relative to the other system users;

from time to time accepting from said users requests for access to said device, and determining for each such request a start time for such request, the start time being dependent upon the assigned percentage of access for the user from whom the request was accepted.

2. The method set forth in claim 1 further including the step of:

ordering the start times of multiple user requests within a given block of time.

3. The method set forth in claim 2 further including the step of:

processing said ordered requests in accordance with the ordered start time.

4. The method set forth in claim 2 wherein during a said fixed time period additional requests from a user will be granted if the calculated start time is prior to the calculated start time of the other ordered start times.

5. The method set forth in claim 2 further including the step of:

reordering, under control of operational system parameters, the effective start times of requests dependent upon said system parameters.

6. The method set forth in claim 5 further including the step of:

providing statistics to each system user for defined operational parameters pertaining to that user's data retrieval requests.

7. The method set forth in claim 1 wherein said determining step includes the step of:

calculating for each user the start time dependent upon the end time of a previous request from said same user.

8. The method set forth in claim 1 wherein requests for access should be granted within a fixed time after said request is accepted.

9. The method set forth in claim 1 further including the step of:

adjusting the access percentage for the system users.

10. The method set forth in claim 1 wherein said system is capable of controlling multiple applications from said users and wherein said method includes the step of:

associating information pertaining to the user's access percentage with all requests from any application controlled by said user.

11. A system where multiple users must from time to time access a bandwidth limited device and wherein each user desires to have a certain percentage of access to said device, the system comprising:

apparatus for assigning to each user a percentage of access time relative to other system users;

apparatus operative from time to time for accepting from said users requests for access to said device, and apparatus for determining for each such request a start time for such request, the start time being dependent upon the assigned percentage of access for the user from whom the request was accepted.

12. The system set forth in claim 11 further including:

apparatus for ordering the start times of multiple user requests within a given block of time.

13. The system set forth in claim 12 further including:

apparatus for processing said ordered requests in accordance with the ordered start time.

14. The system set forth in claim 12 further including:

apparatus for reordering, under control of operational system parameters, the effective start times of requests dependent upon said system parameters.

15. The system set forth in claim 11 wherein said apparatus for determining includes:

apparatus for calculating for each user the start time dependent upon the end time of a previous request from said same user.

16. The system set forth in claim 11 wherein requests for access should be granted within a fixed time after said request is accepted.

17. The system set forth in claim 16 wherein during a said fixed time period additional requests from a user will be granted if the calculated start time is prior to the calculated start time of the other ordered start times.

18. The system set forth in claim 11 further including:

apparatus for adjusting the access percentage for the system users.

19. The system set forth in claim 11 wherein said system is capable of controlling multiple applications from said users and wherein said system includes:

apparatus for associating information pertaining to the user's access percentage with all requests from any application controlled by said user.

* * * * *